DISPLAY DEVICE UTILIZING MAGNETIC MEMORY ELEMENTS FOR DISTRIBUTING A THERMAL PATTERN ON A HEAT SENSITIVE SCREEN

Filed June 29, 1965

3 Sheets-Sheet 1

WITNESSES
Theodore F. Wrobel
James F. Young

INVENTOR
Juris A. Asars
BY Charles F. Renz
ATTORNEY

United States Patent Office 3,415,991

Patented Dec. 10, 1968

3,415,991

DISPLAY DEVICE UTILIZING MAGNETIC MEMORY ELEMENTS FOR DISTRIBUTING A THERMAL PATTERN ON A HEAT SENSITIVE SCREEN

Juris A. Asars, Monroeville, Pa., assignor to Westinghouse Electric Company, Pittsburgh, Pa., a corporation of Pennsylvania Filed June 29, 1965, Ser. No. 467,946
7 Claims. (Cl. 250—83)

ABSTRACT OF THE DISCLOSURE

This invention relates to a display device which incorporates a heat sensitive screen in which the optical properties are modified in response to heat applied thereto. A heat distribution panel is provided adjacent to the heat sensitive screen which consists of a plurality of magnetic memory devices responsive to electrical control for varying the heat generating properties of each of the elements in response to suitable control signals.

This invention relates to a display device and, more particularly, to a heat distribution system for impressing a heat pattern on a display screen for modifying the optical properties of the display screen.

A particular application of this invention is for the application of a heat pattern to a cholesteric liquid crystal display screen in which the heat modifies the optical properties of the cholesteric liquid crystalline material. The utilization of these cholesteric liquid crystalline materials for the heat sensitive display screen is particularly advantageous in the display of visible images especially in high ambint illumination because the image is produced by selectively reflected energy rather than internally generating the energy. The greatest problem encountered in the design of such a display system is associated with the production of the thermal image. The conversion of the thermal energy image to an optical image is accomplished by a cholesteric liquid crystal film supported on a substrate whose temperature is controlled by a relatively simple means. For applications with moderate requirements on the information distribution, previously proposed methods of generating the thermal image possess advantages in simplicity. While these systems are suitable for representation of simple information, more demanding requirements increase the complexity of such systems to the point where either their advantages are lost or their capabilities are surpassed. In certain military applications, a very large amount of highly processed information is supplied by a computer or similar source to a display panel which must have very quick access as well as relatively long retention or storage capabilities.

The liquid crystalline materials of the cholesteric phase exhibit curious changes in light reflecting properties when heated or cooled through a transition region near their melting point. The changes in reflectivity are manifested as changes in color when the viewing light is of white light. The material is substantially colorless at temperatures well above its melting point but as it is cooled and becomes more viscous, it goes through a transition region in which it appears blue, then green, then yellow, then red and finally colorless again as viewed in reflective light. If cooled sufficiently, the viscous liquid is converted to a colorless crystalline solid. The color changes occur at definite, reproducible temperature differences within a range of temperatures which may be made relatively broad or relatively narrow by adjusting the formulation of the liquid crystalline material. The optical scattering properties of the liquid crystalline layer can be modified by providing in intimate contact therewith, elemental driving elements to provide a localized temperature rise whereby localized heating is superimposed or placed in close contact with the liquid crystalline screen. Thus, for a given liquid crystalline material, a suitable temperature can be found to give an overall background color such as black or red in reflected white light and then by elevating the temperature of localized spots or areas, these spots may be made to appear yellow or green on the contrasting black or red background.

By utilizing monochromatic viewing light, single color contrast may be obtained on a given background and brightness alone will vary with temperature. The properties of these materials are more fully discussed in U.S. Patent 3,114,836 by Fergason et al. and assigned to the same assignee as this invention.

It is accordingly an object of this invention to provide a simple syste mcapable of providing a high intensity display of information.

It is another object to provide a high intensity display of information for any predetermined length of time.

It is still another object to provide a display system capable of providing a high intensity display of information in a plurality of colors.

It is still another object to provide an improved means for distribution and establishment of a thermal image.

Briefly, the present invention accomplishes the above-cited objects by providing a display screen of a heat sensitive material such as a liquid crystalline material of the cholesteric phase and providing heating elements adjacent said heat sensitive screen in which the heating elements consist of a plurality of magnetic devices with means associated therewith to cause magnetic flux reversals therein and thereby generate heat image.

Further objects and advantages of the invention will become apparent as the following description proceeds and the features of novelty which characterize the invention will be pointed out in particularity in the claims annexed to and forming a part of the specification.

For a better understanding of the invention, reference may be had to the accompanying drawings, in which.

Figure 5A:
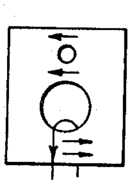
Figure 6:
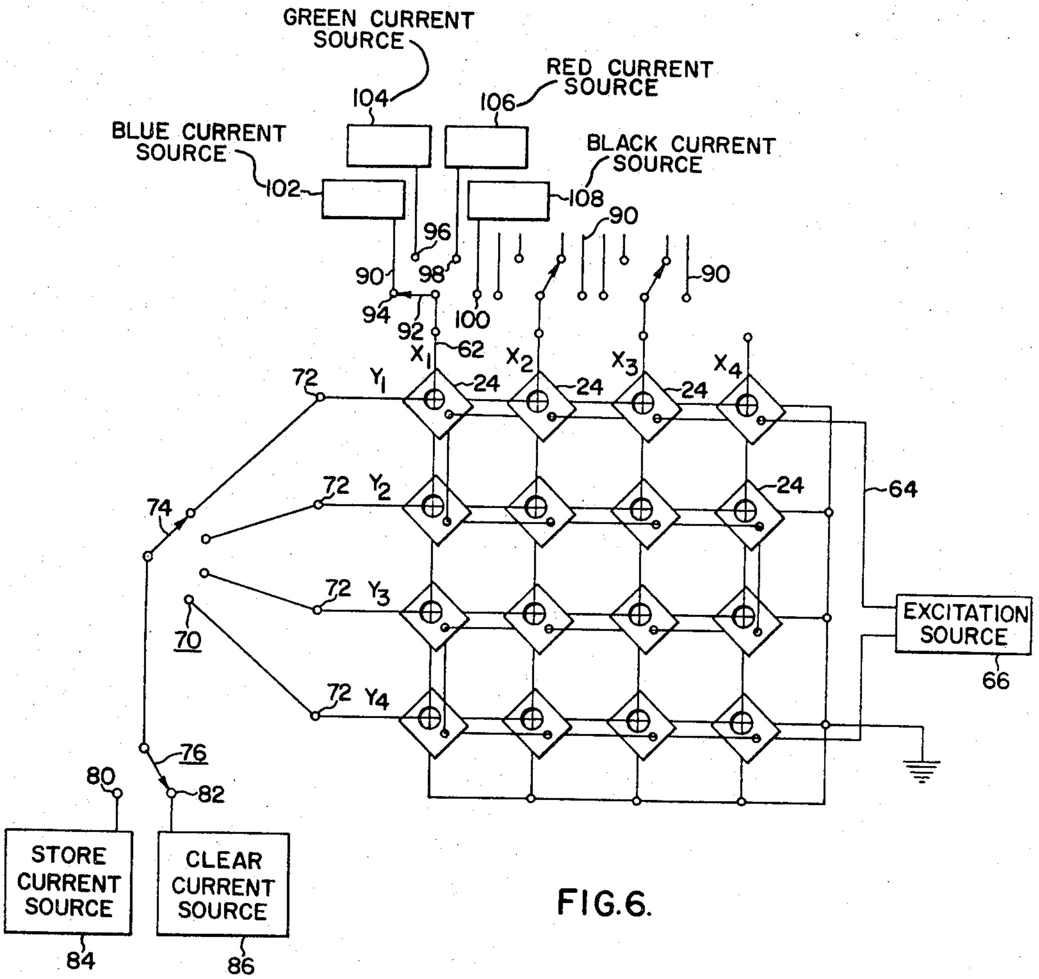

FIGS. 5*a*, *b*, *c*, *d*, *e*, *f* and *g* illustrate residual flux states in the magnetic memory material;

FIG. 6 is a circuit array incorporating the invention; and

Figure 1:
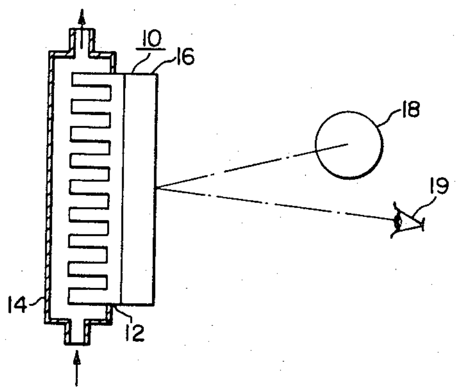
FIG. 1 illustrates a system incorporating the invention.
Figure 7:
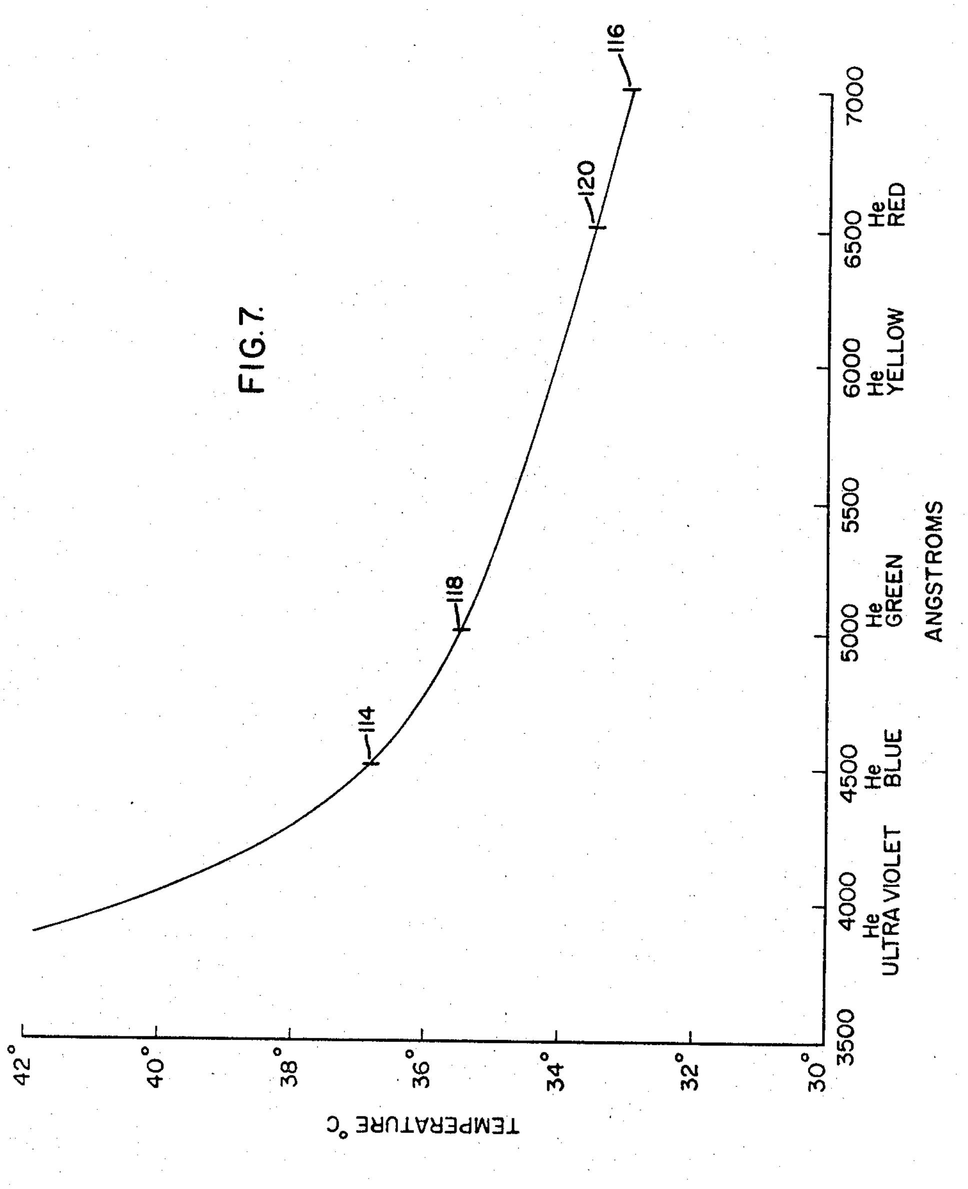

FIG. 7 is a graph illustrating the reflection properties of the liquid crystal screen illustrated in FIG. 1.

Referring in detail to FIG. 1, a display system is illustrated. The display system consists of a display screen assembly 10. The display screen assembly 10 includes a heat sink member 12 and an associated cooling means 14 in which a liquid such as water is directed therethrough for controlling the temperature of the display screen assembly 10. A thermoelectric cooling means may also be utilized. The display screen assembly includes a display unit 16 mounted on the heat sink 12 and on which a visible image is presented. A light source 18 is provided for illuminating the display screen 16 by a suitable light such as white light. The illumination of the screen 16 by the light source 18 provides a visible display which may be viewed by an observer illustrated by the numeral 19.

Figure 2:
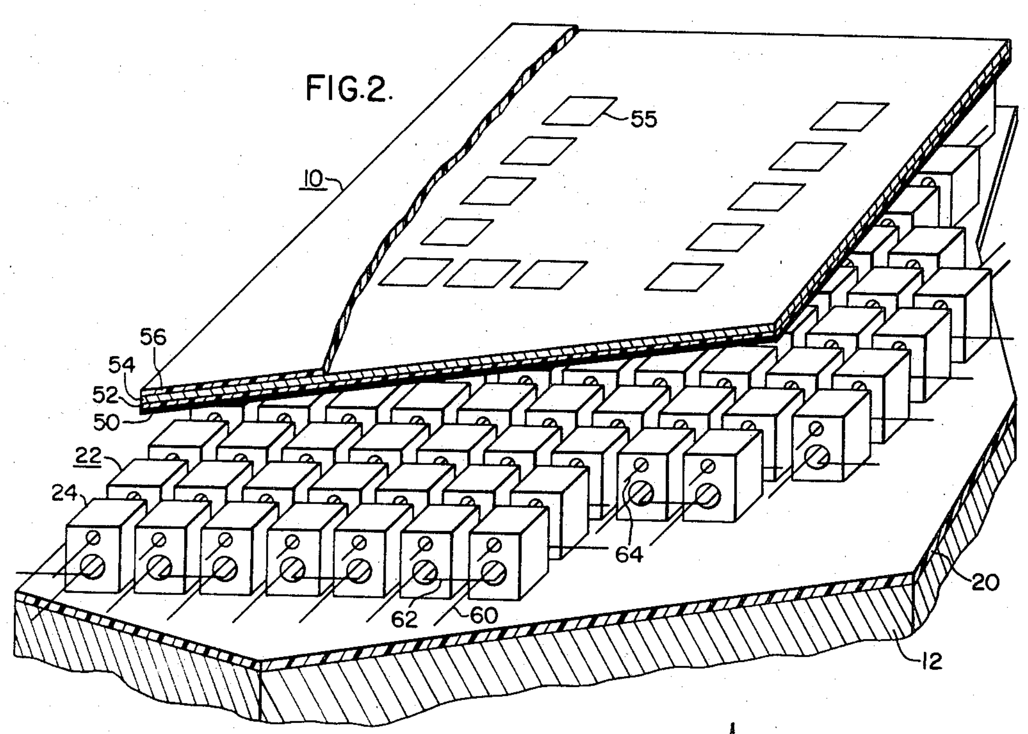
FIG. 2 is a perspective view partially cut away illustrating the screen structure shown in FIG. 1.

Referring now to FIG. 2 for details of the display screen assembly 10, the display screen 16 is mounted on the heat sink 12. The heat sink 12 may be of any suitable good thermally conductive material such as a metallic layer of a material such as copper or aluminum. A thermal barrier layer 20 may be provided on the heat sink 12 of a suitable thermal insulating material such as polyethylene terephthalate. The thermal barrier layer 20 is to reduce thermal conductance from the sensitive screen portion 16 to the heat sink layer 12 if less excitation power is desired. The layer 20 may not be required in some applications.

A heat distribution layer 22 is provided upon the thermal barrier layer 20. In the specific embodiment shown here, the thermal distribution layer 22 consists of a plurality of magnetic memory devices and illustrated as two aperture transfluxors 24. Each of the transfluxors 24 provides a small area display element and in the normal embodiment, there would probably be about ten of these transfluxors 24 per linear inch. The thermal distribution layer 22 is made up of a plurality of magnetic elements 24 of a ferromagnetic material. The elements 24 are normally made up and pressed from a mixture of ferric oxide powder and other materials and then baked in an oven. The magnetic memory devices 24 may be in many different shapes and configurations and if desired, may be simply a well known magnetic core if storage is not required. The specific device illustrated herein provides a magnetic structure which has storage features incorporated.

Figure 3:
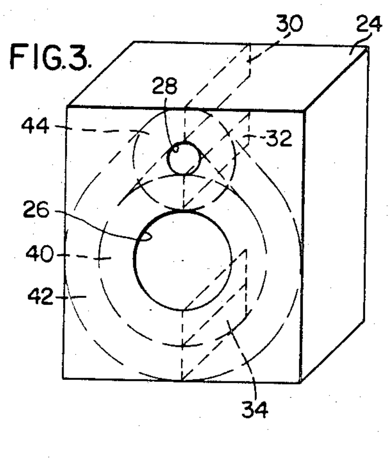
FIG. 3 is an enlarged view of a magnetic memory device illustrated in FIG. 2.
Figure 4:
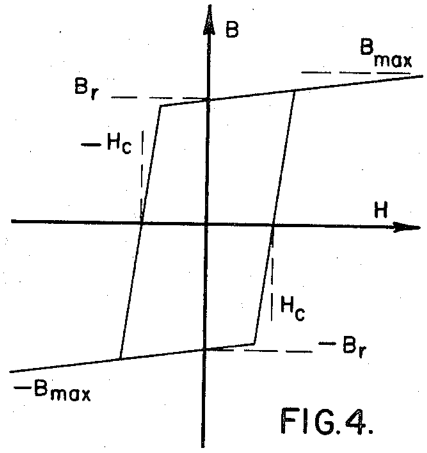
FIG. 4 is an ideal B–H curve of the magnetic memory material.

The transfluxor 24 which is shown enlarged in FIG. 3 consists of a major aperture 26 and a minor aperture 28. If a section is taken of this transfluxor 24 along the center lines of the two apertures 26 and 28, the cross-sectional area of the region 30 is equal to the cross-sectional area of the region 32 and the sum of these two areas 30 and 32 is equal to the area of the region 34. FIG. 4 shows an idealized B-H curve of the material in element 24 where $B_r$ is the residual flux density following maximum magnetization $B_{max}$ and $H_C$ the coercive force of the major hysteresis loop. If it is assumed that $I_{40}$ is the current in a single turn winding necessary for reaching $H_C$ in every part of the shaded magnetic path 40 which encloses only the major aperture 26, that $I_{42}$ is the corresponding current for a shaded magnetic path 42 which encloses both apertures 26 and 28, and that $I_{44}$ is the corresponding current for a path 44 enclosing only the minor aperture 28, then the relationship of these currents may be expressed as $I_{42}>I_{40}>I_{44}$.

Referring now to FIG. 5 for an explanation of the general operation of the transfluxor element 24. If clearing current $I_C$, which is somewhat greater than $I_{42}$ is passed through the larger aperture 26 in a direction as indicated in FIG. 5*a*, magnetic flux in all three regions 30, 32 and 34 saturates in a counterclockwise direction about the larger aperture 26. When this current is removed, the flux density is reduced only slightly to the residual value $B_r$. Complete saturation in each of these areas 30, 32 and 34 is achieved because of the cross-sectional area relationship stated above. When a small excitation current $I_r$, where $I_{44}=I_r$, is then passed through the smaller aperture 28 as indicated in FIG. 5*b*, no flux reversal takes place because in every portion of the region 32 the material is already saturated in the direction of the magnetic field produced by the current $I_r$. If the current $I_r$ is passed through the small aperture 28 in the opposite direction as indicated in FIG. 5*c*, no flux reversal takes place because of the saturation in region 30. In these two cases illustrated by FIGS. 5*b* and 5*c*, only a minute amount of energy is dissipated because flux changes from $B_r$ to $B_{max}$ are only possible and the hysteresis loop illustrated in FIG. 4 is not traversed.

Figure 5B:
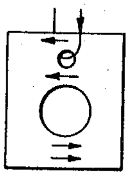
Figure 5C:
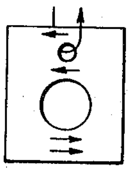
Figure 5D:
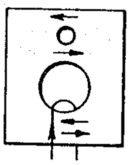
Figure 5E:
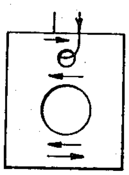
Figure 5F:
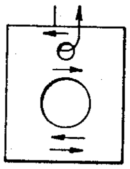
Figure 5G:
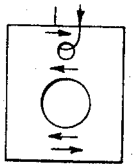

If, after the clearing current $I_C$ has been applied (see FIG. 5*a*), a writing current $L_W$ equal to $I_{40}$ is passed through the major aperture 26 in the opposite direction as $I_C$ as shown in FIG. 5*d*, flux is reversed in the shaded region 40. $I_W$ is smaller than the minimum current to reverse any residual flux in region 42, and residual flux after termination of $I_W$ is reversed only in the region 32 and not in 30. The result is that a counterclockwise residual flux is found around the minor aperture 28, in region 44. Now, if the excitation current $I_r$ is passed through the small aperture 28, a flux reversal takes place as shown in FIG. 5*e* in the region 44. After the removal of this current, the residual flux around the small aperture 28 is in a clockwise direction and can again be reversed to the counterclockwise direction by an excitation current $I_r$ in the opposite direction as shown in FIG. 5*f*. Such reversals can be continued with current pulses of alternating polarity without affecting the residual flux in region 34 and therefore its memory state. During these flux reversals the hysteresis loop is traversed in the shaded path 44 of FIG. 3 and an amount of energy much larger than in cases illustrated in FIGS. 5*b* and 5*c* is dissipated during each current pulse.

The above explanation shows that, if an alternating current pulse $I_r$ is passed through the smaller aperture 28, the amount of energy dissipated in the memory core 24 and therefore its temperature rise is determined by the presence or absence of a writing pulse $I_W$ after a clearing pulse $I_C$. The characteristics of the core geometry and its material determine the ratio between the dissipations in the two cases, but the absolute power dissipation can be controlled by the choice of excitation current pulse frequency.

The amount of writing current is such as to exceed the switching threshold, that is the minimum drive necessary to switch any remanent flux from counterclockwise to clockwise as illustrated by FIGS. 5*c* and 5*d* and determines the amount of remanent flux that is acted upon by the excitation current. It is found that a high degree of linearity can be achieved between the remanent magnetic flux and the applied drive and this information may be stored for an infinite time. Thus, the writing current can determine the regions in magnetic path 44 in which flux reversals occur in response to the excitation current. The larger the extent of these regions, the greater will be the heating found in the transfluxor element 24. The properties of the transfluxor elements 24 are well known in the art and the above-description is given to fully appreciate and understand the operation of the transfluxor as a heating element in the screen structure and the manner in which varying degrees of heating can be obtained for display of information. How this heating property is utilized will be more fully explained with respect to FIG. 6.

Referring again to FIG. 2, the next layer provided upon the thermal distribution layer 22 is a coating 50 of a suitable material such as a black dye. Positioned on the black coating 50 is a protective film 52 of a suitable material such as polyethylene terephthalate. Positioned on the layer 52 is a layer 54 of a liquid crystalline material of the cholesteric phase which is sensitive to heat. Suitable materials are described in the previously mentioned U.S. Patent 3,114,836. A specific material may be a mixture of 60 percent by weight cholesteryl nonanoate, 20 percent by weight of oleyl cholesteryl carbonate, and 10 percent by weight of cholesteryl benzoate. The response of this liquid crystalline material to heat illustrated by the curve in FIG. 7. A protective coating 56 of a similar material as layer 52 may be provided on the layer 54. Heating of selected transfluxor elements 24 results in a display of elemental areas 55 as illustrated in FIG. 2.

Referring in detail to FIG. 6, a 4 by 4 circuit assembly or transfluxor matrix is illustrated. Two single turn windings 60 and 62 pass through the large aperture 26 and carry the control signal current pulses. The winding 60 is the X winding and is common to a whole column of transfluxors and permits the selection of an element 24 in the horizontal direction. The winding 62 is the *y* winding and is common to a whole row of transfluxors and permits the selection of an element 24 in the vertical direction of the display panel. A single turn winding 64 passes through the smaller aperture 28 of the transfluxor elements 24 and is common to all the elements in the matrix and supplies the excitation signal from a source 66.

Each of the Y windings 60 is connected to a separate terminal 72 of a first switching means 70. The switch 70 includes a rotating contact 74 for contacting any of the terminals 72. The rotating contact 74 is connected to the rotating contact 78 of a second switching means 76. The switch 76 includes two terminals 80 and 82 which are in turn connected respectively to current sources 84 and 86. The current source 84 provides a suitable value of current, for example a 300 mil positive pulse to provide a pulse to the Y winding 60 during the store operation. The current source 86 provides a current source of about 600 mils which is of negative polarity and is utilized to erase or clear information from the transfluxors 24.

Each of the X windings 62 are connected to a separate switch 90 and specifically to the rotating contact member 92. The twitch 90 consists of four terminals 94, 96, 98 and 100 which are connected respectively to a blue information current source 102, a green information current source 104, a red information current source 106, and a black information current source 108. The current pulse of these respective sources 102, 104, 106 and 108 might be of the values of 150 mils, 100 mils, 50 mils, and 0 mils respectively.

In the operation of the device, assuming that the switch 76 is connected to the source 86 and all of the transfluxors 24 have been cleared as indicated by the representation in *5a*, then the switch 76 would be thrown to the terminal 80 to connect the current source 84 which is the store pulse to winding Y. If the switch 90 is placed on terminal 94 so as to connect the blue source to the winding $X_1$, then an adequate signal will pass through the transfluxor common to $X_1$ and $Y_1$ and information will be written or stored on the transfluxor in a manner represented by FIG. *5d*. Current flowing through the excitation winding 64 from the current source 66 which may provide a current of 250 mils both in the negative and positive direction and at a frequency of about 200 kilocycles, will cause heating of the transfluxor common to $X_1$ and $Y_1$ to a point 114 on the curve in FIG. 7. This is at a temperature of about 37° C. Light directed from the source 18 onto the liquid crystalline layer 54 will result in light of a blue color being reflected from an element 55 of the screen. The transfluxor common to $X_1$ and $Y_1$ will continue to reflect this light until a signal from the erase or clear source 86 is applied so as to remove this write information. If the switch 90 is thrown to connect the black source 108, then a point 116 on the curve of FIG. 7 will be reached and a black element will be seen by the viewer. In this condition, the transfluxor 24 does not have any flux reversals but simply remains in a clear state due to the erase pulse and the source 84 is inadequate writing current to write any information in the transfluxor. Corresponding switching of the switch 90 to pulse source 104 in the liquid crystal operating on point 118 and source 106 results in operation on point 120. The reflected colors in this instance would be respectively green and red.

In the above manner, a color image may be written onto the display screen and will be stored thereon to provide a visual color image until the information is cleared from the transfluxors.

While there has been shown and described what are presently considered to be the preferred embodiments of the invention, modifications thereto will readily occur to those skilled in the art. It is not desired, therefore, that the invention be limited to the specific arrangements shown and described and it is intended to cover in the appenedd claims all such modifications as fall within the true spirit and scope of the invention.

I claim as my invention:

1. A display system comprising a light control device including a layer of liquid crystalline material of a cholesteric phase, a thermal distribution layer provided in thermal contact with said liquid crystalline layer, said thermal distribution layer including magnetic memory devices.

2. A storage display system comprising a light control device including a layer of thermal distribution means, said thermal distribution means including a plurality of magnetic elements, said magnetic elements including a plurality of apertures, means associated with said magnetic elements for selectively writing information into said elements through electrical conductive means passing through one of said plurality of apertures and excitation means in the form of electrical conductive means passing through another of said plurality of apertures for providing alternating flux reversals in said magnetic elements to generate heat in accordance with the amount of information written therein.

3. A display system comprising a light control device including a layer of liquid crystalline material of cholesteric phase, and means for distributing information to said layer comprising a magnetic memory device which exhibits the property of heating due to flux reversals.

4. A control device including thermal distribution means, said thermal distribution means including a plurality of magnetic elements, said magnetic elements including a plurality of apertures, writing means associated with said magnetic elements for selectively writing information into said elements by passing a current through an electrical conductive member passing through one of said plurality of apertures and excitation means for heating said magnetic elements by passing a current through an electrical conductive member passing through another of said plurality of apertures to cause flux reversals in said magnetic elements to generate heat in accordance with the amount of information written therein.

5. A display system comprising a layer of liquid crystalline material of a cholesteric phase which exhibits the property of change of light reflecting properties in response to heat, a thermal distribution means provided in thermal contact with said liquid crystalline layer, said thermal distribution means including magnetic memory devices which exhibit the property of generating heat in response to flux reversal therein.

6. A storage display system comprising a heat sensitive screen, means for impressing a thermal image on said heat sensitive screen, said means comprising a plurality of magnetic elements, each of said magnetic elements including a first and second aperture, writing means associated with said first aperture for selectively writing information into said magnetic elements, excitation means associated with said second aperture generating flux reversals to generate heat in accordance with the amount of information written therein.

7. A display system comprising a light control device comprising a layer including cholesteric crystalline material exhibiting the property of change of light reflection properties in response to heat, a first means for impressing a heat image on said layer, said means including a magnetic memory material exhibiting the property of generation of heat due to flux reversals therein and second means for causing flux reversals in said first means to effect heating of said layer.

References Cited

UNITED STATES PATENTS

| | | | |
|---|---|---|---|
| 3,114,836 | 12/1963 | Fergason et al. | 250—83 |
| 3,219,993 | 11/1965 | Schwertz | 346—76 X |
| 3,319,251 | 5/1967 | Reis | 346—76 X |

ARCHIE R. BORCHELT, *Primary Examiner.*

U.S. Cl. X.R.

250—83.3; 340—174; 346—76